United States Patent [19]

Masaki et al.

[11] Patent Number: 4,666,218
[45] Date of Patent: May 19, 1987

[54] ANTISKID CONTROL WITH SURFACE FRICTION COMPENSATION

[75] Inventors: Syouichi Masaki; Kimio Tamura, both of Anjo; Teruyoshi Wakao; Noriyuki Nakashima, both of Nagoya; Ken Asami; Kazunori Sakai, both of Nagoya, all of Japan

[73] Assignees: Nippondenso Co., Ltd., Kariya; Toyota Jidosha Kabushiki Kaisha, Toyota, both of Japan

[21] Appl. No.: 638,717

[22] Filed: Aug. 8, 1984

[30] Foreign Application Priority Data

Aug. 9, 1983 [JP] Japan ................... 58-145257

[51] Int. Cl.⁴ .................................. B60T 8/70
[52] U.S. Cl. .................... 303/106; 303/109; 364/426
[58] Field of Search ............ 303/103, 105, 106, 107, 303/109, 96, 97, 110; 188/181 A, 181 C; 364/426, 565

[56] References Cited

U.S. PATENT DOCUMENTS

| | | | |
|---|---|---|---|
| 3,578,819 | 5/1971 | Atkins | 303/106 |
| 3,674,320 | 7/1970 | Howard et al. | 303/106 |
| 3,698,772 | 10/1972 | Nixon | 303/97 |
| 3,717,384 | 2/1973 | Harned | 303/107 |
| 3,861,756 | 1/1975 | Arikawa | 303/106 |
| 4,143,926 | 3/1979 | Miller | 303/110 |
| 4,347,569 | 8/1982 | Allen | 303/96 |
| 4,395,761 | 7/1983 | Sato et al. | 303/106 |
| 4,466,066 | 8/1984 | Saumwcher et al. | 364/426 |

FOREIGN PATENT DOCUMENTS 0050280 4/1982 European Pat. Off. .

OTHER PUBLICATIONS

Bosch Techische Berichte, vol. 7, No. 2, 1980, pp. 65–94, Stuttgart, DE; H. Leiber et al.: "Antiblockiersystem (ABS) für Personenkraftwagen".

Primary Examiner—John W. Caldwell, Sr.
Assistant Examiner—Alvin Oberley
Attorney, Agent, or Firm—Cushman, Darby & Cushman

[57] ABSTRACT

In an antiskid control system for the hydraulic braking system of a wheeled vehicle, the rotational speed of a vehicle wheel and the acceleration of the wheel are detected and levels of road surface friction are determined on the basis of the wheel speed and acceleration to give a first indication that the road has a high value of friction or a second indication that the road has a low value of friction. The wheel speed and acceleration are analyzed to detect a down-pressure mode to decrease the fluid pressure of the braking system and an up-pressure mode to increase the pressure. In response to the presence of the first indication, the down-pressure mode is effected at a lower rate and then at a higher rate. In response to the occurrence of the second indication, the down-pressure mode is effected at the higher rate.

9 Claims, 14 Drawing Figures

ANTISKID CONTROL WITH SURFACE FRICTION COMPENSATION

BACKGROUND OF THE INVENTION

The present invention relates to an antiskid control system.

Antiskid control systems which are presently known in the art are unsatisfactory for operation under all kinds of road surface conditions. In particular, conventional antiskid control systems do not function properly when running on roads having friction values which vary between a low friction value as represented by an icy road surface and a high friction value as exhibited by a dry concrete road surface. The friction value also depends on the amount of wear of the wheels and the material of the wheels. Therefore, difficulty has been encountered in providing optimum control on releasing brake presssure under varying road surface frictions.

SUMMARY OF THE INVENTION

Accordingly, the present invention provides an antiskid control system which is capable of detecting the surface friction of a road for appropriately controlling the hydraulic brake pressure.

According to the invention, the speed of rotation of a vehicle wheel and the acceleration of the wheel are detected. Levels of road surface friction are determined on the basis of the wheel speed and acceleration and an indication is given whether the road has a high or a low value of friction. The wheel speed and acceleration are analyzed to determine whether they justify a down-pressure mode to decrease the brake pressure or an up-pressure mode to increase the pressure. In response to presence of the indication of the high friction value, the down-pressure mode is effected with a lower rate and then at a higher rate. This prevents excessive reduction of pressure. In response to the occurrence of the indication of the low friction value, the down-pressure mode is effected at the higher rate.

BRIEF DESCRIPTION OF THE DRAWINGS

The present invention will be described in further detail with reference to the accompanying drawings, in which.

DETAILED DESCRIPTION

Figure 1:
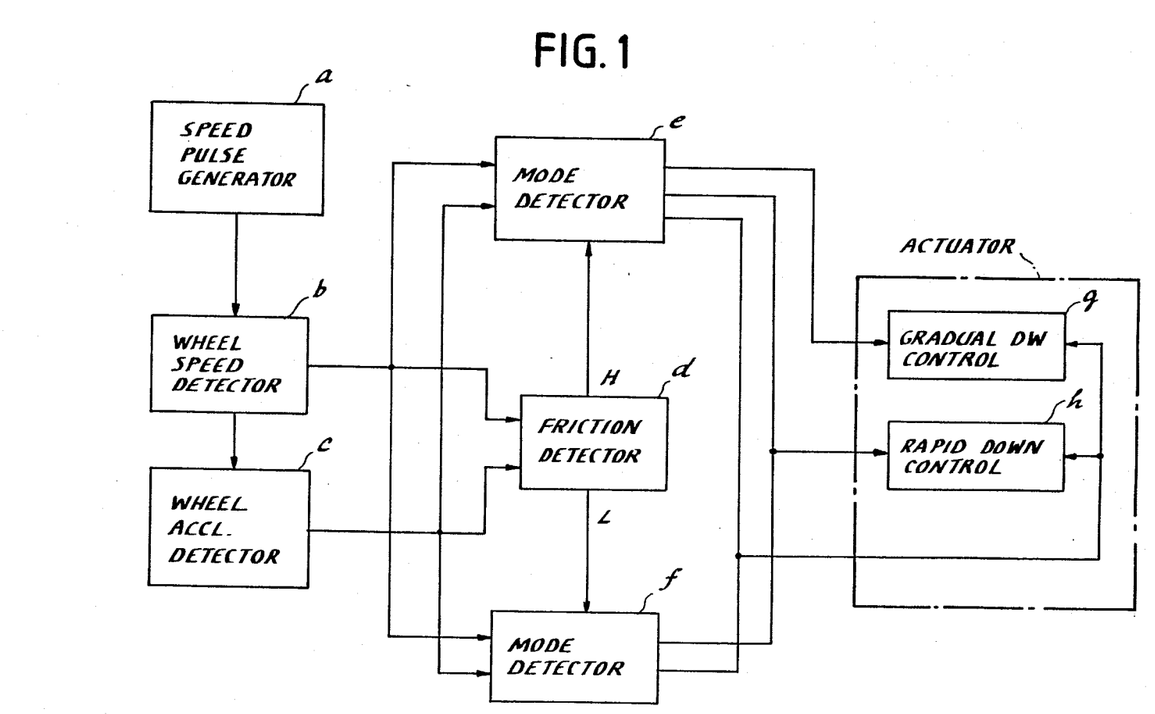
FIG. 1 is a schematic illustration of an antiskid control system embodying the invention.

The antiskid control system of the present invention represented in FIG. 1 comprises generally a plurality of wheel speed pulse generators a (only one of which is shown) associated respectively with the wheels of a vehicle for generating a pulse signal from each generator. The pulse signal is applied to a wheel speed detector b in which the pulse signal is translated into a signal indicating the instantaneous value of the wheel speed. The speed signal is applied to a wheel acceleration detector c a friction detector d, and mode detectors e and f. The acceleration detector c generates a signal indicating the acceleration of the wheel and applies it to friction detector d and mode detectors e and f. The friction detector d is responsive to the wheel speed and the wheel acceleration provided by the signals from the detectors b and c for detecting when the road surface has a high or a low value of friction and provides a high-friction signal H or a low-friction signal L to the mode detectors e and f, respectively.

Mode detector e is responsive to the high friction signal for detecting when the wheel speed and the wheel acceleration justify a down-pressure mode, and if this down pressure mode is justified, first operates a gradual down-pressure control solenoid g of an actuator associated with the wheel from which the speed information is derived. This results in the pressure applied to the wheel's brake being decreased gradually. Then a rapid down-pressure control solenoid h is operated so that the brake pressure is rapidly decreased. Mode detector e further detects when the wheel speed and wheel acceleration justify an up-pressure mode for disabling the pressure decreasing control solenoids g and h.

Mode detector f is responsive to the low friction signal for detecting when the wheel speed and the wheel acceleration justify the down-pressure mode and operating the rapid down-pressure control solenoid h and further detecting when the wheel speed and the wheel acceleration justify the up-pressure mode for disabling the solenoid h.

Figure 2:
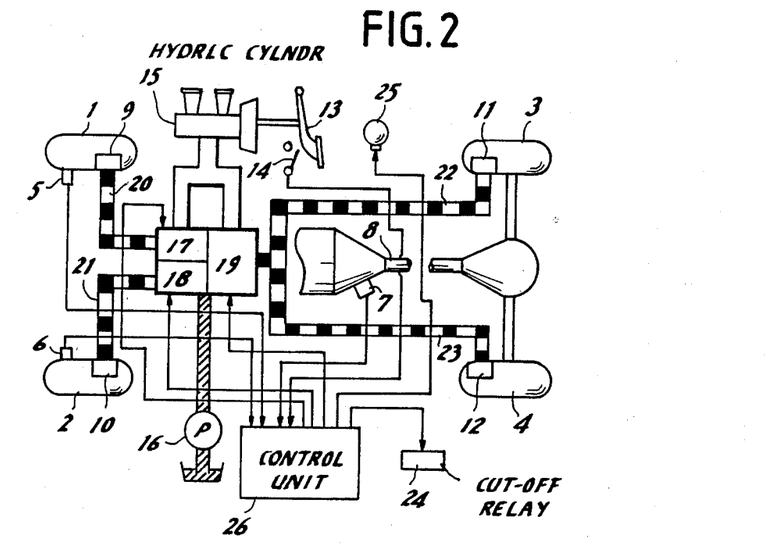
FIG. 2 is an illustration of the mechanical part of the antiskid control system.

FIG. 2 shows a general structure of the antiskid system of the invention incorporated in a rear drive vehicle. Wheel speed sensors 5 and 6 on front-right and front-left wheels 1 and 2 provide front wheel speed signals independently to a control unit 26, and a rear wheel speed sensor 7 is located on a propeller shaft 8 that drives rear-right and rear-left wheels 3 and 4 to provide an average rear wheel speed to the control unit. Pressure control signals are supplied from control unit 26 to solenoid-operated actuators 17, 18, 19 which in turn control pressures of hydraulic brakes 9, 10, 11, 12 mounted on wheels 1, 2, 3, 4 through lines 20, 21, 22, 23, respectively. Brake-pedal ON or OFF signal is fed from stop switch 14 located in proximity to brake pedal 13 to control unit 26. A hydraulic cylinder 15 provides a brake pressure to actuators 17–19 in response to brake pedal 13 being depressed. Solenoid actuators 17–19 are supplied with a constant hydraulic pressure from a pump 16. Control signals are supplied to the actuators 17-19 through a fail-safe cut-off relay 24 from control unit 26. A warning light 25 is provided to alert vehicle passengers when a disconnection has occurred in the circuits to the solenoid actuators and stop switch 14.

Figure 3:
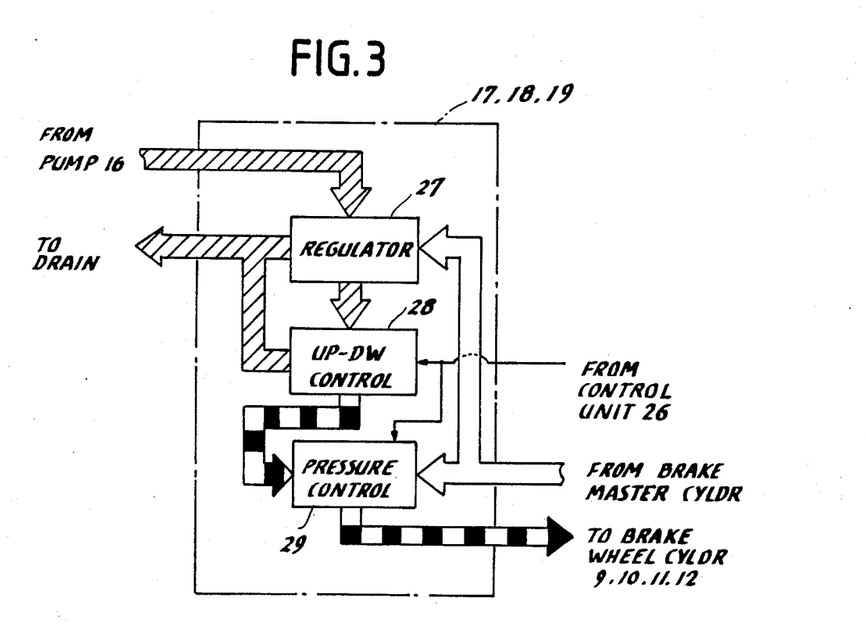
FIG. 3 is an illustration of the detail of the actuators of FIG. 2.

As illustrated in FIG. 3, each of solenoid actuators 17-19 comprises a pressure regulator 27 which is connected to pump 16 to regulate the hydraulic pressure at a constant level. A control valve unit 28 includes a switching solenoid which provides brake pressure up-down control and a pressure control solenoid that controls the gradient of pressure applied to brakes. Further provided is a brake pressure controller 29 including a switching solenoid that provides high pressure variation when energized and low pressure variation when de-energized. The output of controller 29 is connected to the brake wheel cylinder of the associated brake.

Figure 4:
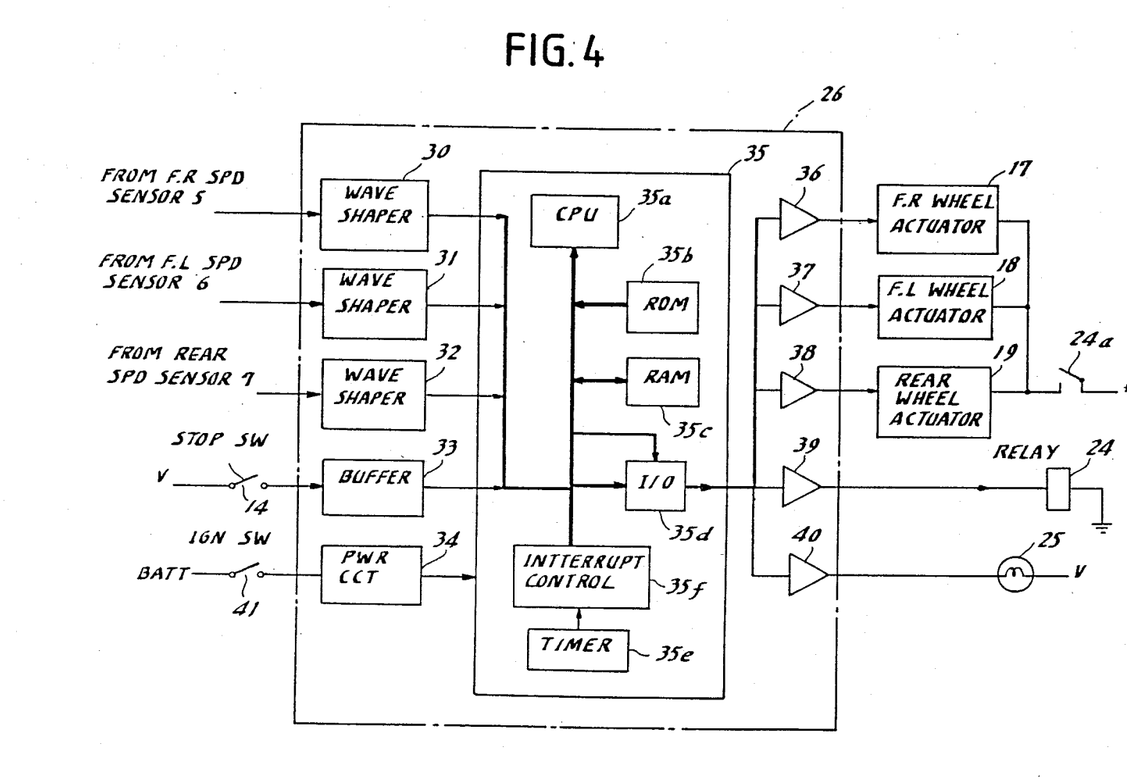
FIG. 4 is an illustration of the detail of the control unit of FIG. 2.

FIG. 4 is an illustration of the detail of control unit 26. Wheel speed signals from sensors 5, 6, 7 are shaped into rectangular pulses by waveshaping circuits 30, 31, 32 and stop signal from switch 14 is fed to a buffer 33. Microcomputer 35, which is powered by circuit 34 in response to ignition switch 41, includes a microprocessor (CPU) 35a that receives these signals through an input/output port 35d to perform operations according to programmed instructions stored in read-only memory 35b. Temporary data is stored in RAM 35c during the process of input data which will be described in detail later. Brake control signals from microcomputer 35 are fed through drivers 36, 37, 38 to solenoid-operated actuators 17, 18, 19, respectively, which are connected in circuit with the relay contacts 24a of cut-off relay 24 which is energized by a driver 39. Driver 40 energizes warning light 25 under control of microcomputer 35. A timer 35e provides a timing pulse at regular intervals to an interrupt control unit 35f which in response to the timing pulse issues an interrupt command to microprocessor 35a. As will be described later, the microprocessor interrupts its main routine execution to execute a timer interrupt subroutine in which it selects an appropriate brake pressure gradient pattern and operates the actuators 17-19.

When ignition switch 41 is turned on, microcomputer 35 initiates executing instructions stored in ROM 35b. The program shown in FIG. 5 starts with a block 101 where various temporary data such as flags are initialized. Control is passed to a subroutine 102 in which antiskid control go-ahead decisions and start timing decision are made. As shown in FIG. 6, subroutine 102 comprises three successive steps 1021 to 1023 for making decisions by proceeding with a block 1021 in which the microcomputer checks if the antiskid system is functioning properly. In block 1022, vehicle speed Vsb is compared with a reference speed (5 km/h, for example) to detect if the vehicle is higher than the reference, and in block 1023 the ON-state of stop switch 14 is detected. If these decisions are all affirmative, control is passed to a block 1024 to set go-ahead flag $F_{act}$. If any one of these decisions is negative, control is passed to blocks 1025 and 1028 in succession to reset go-ahead flag $F_{act}$ and control start flag $F_{sta}$, respectively. Block 1026 is then executed to detect if any one of sensed wheel speed values Vw is lower than a reference speed Vss which represents the upper limit for effecting antiskid control. Control is passed to block 1027 to set control start flag $F_{sta}$ if the speed value Vw becomes lower than reference speed Vss.

Figure 7:
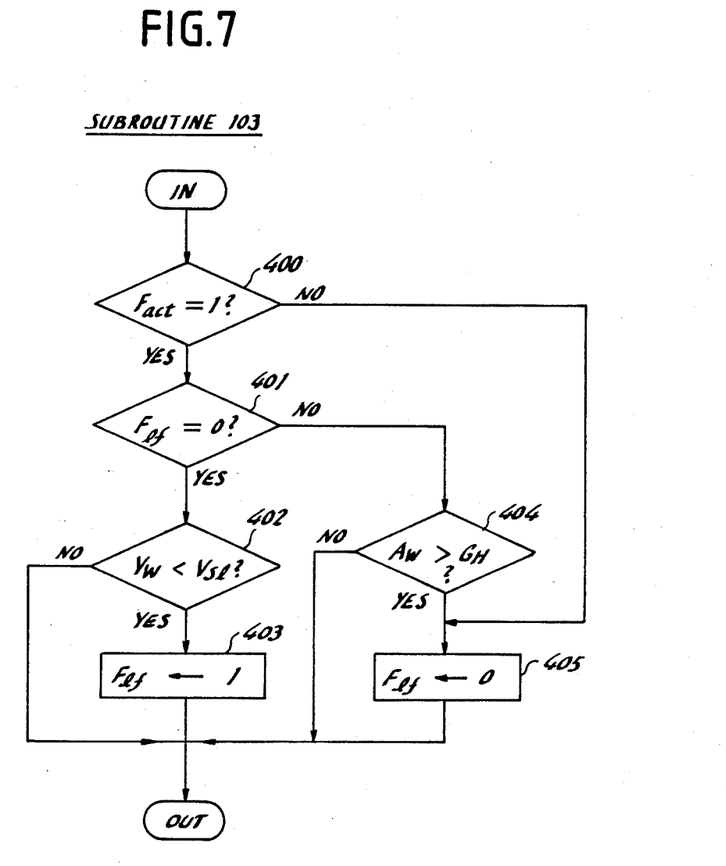
FIG. 7 is a flow diagram describing the road surface friction determination subroutine of FIG. 5.

The microcomputer then advances to a subroutine 103 to determine the degree of road surface friction. FIG. 7 illustrates the steps necessary to obtain such information using data representing reference wheel speed and wheel acceleration stored in ROM 35b. The subroutine 103 starts with a decision step 400 in which the microprocessor checks start flag $F_{sta}$ to determine if go-ahead decision has been taken. If $F_{sta}=0$, indicating that antiskid control is not yet started, control is passed to block 405 to reset a low-friction flag $F_{lf}$ and proceeds to subroutine 104. If $F_{sta}=1$ in block 400, control is passed to block 401 to check the status of the low-friction flag $F_{lf}$. If $F_{lf}=0$ in block 401, an indication is given that a high friction condition was detected in a previous program execution and control exits to block 402 to determine if the vehicle has entered a low friction surface road by comparing vehicle speed Vw with a lower threshold Vsl. If the road surface condition has not changed with respect to the previous execution, Vw is not smaller than Vsl and control advances to the next subroutine 104. If the road surface condition has changed from the high friction state to a low friction state, wheel speed value Vw must have been reduced below Vsl and control is passed to block 403 to set up the low-friction flag $F_{lf}$.

If low friction surface condition was detected in the immediately prior execution, the low-friction flag is not "0" in block 401 and control proceeds to block 404 to compare wheel acceleration Aw with a low-to-high friction determination threshold $G_H$. If the vehicle entered a low friction road on immediately prior executions, wheel acceleration Aw must be lower than $G_H$, and "no" decision is taken in block 404 and control returns to the main routine. As long as low friction condition continues, acceleration Aw is lower than $G_H$ and control is passed through blocks 400, 401 and 404, maintaining the flag status $F_{lf}=1$. When the low-to-high friction determination threshold $G_H$ is exceeded, control is passed to block 405 to reset $F_{lf}$ to zero.

Figure 8:
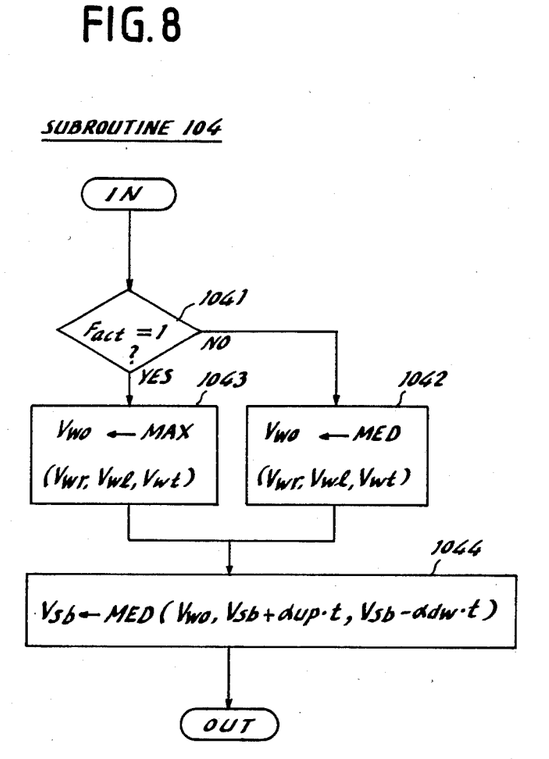
FIG. 8 is a flow diagram describing the vehicle speed determination subroutine of FIG. 5.

In subroutine 104, vehicle speed Vsb is estimated on the basis of wheel speeds according to a program shown in FIG. 8 which commences with block 1041 which checks whether a go-ahead flag $F_{act}$ has been set up. If $F_{act}=0$, control is passed to block 1042 to derive a reference wheel speed value Vwo from a medium value of front-right, front-left and rear wheel speed values Vwr, Vwl, Vwt. If $F_{act}=1$, control is passed to block 1043 to derive the reference wheel speed Vwo from the maximum of these wheel speeds. In a subsequent block 1044, a previously derived vehicle speed value Vsb is trimmed by the amount of vehicle acceleration or deceleration and a medium value of the reference speed Vwo and the trimmed vehicle speeds is detected as an estimated value of current vehicle speed.

Figure 5:
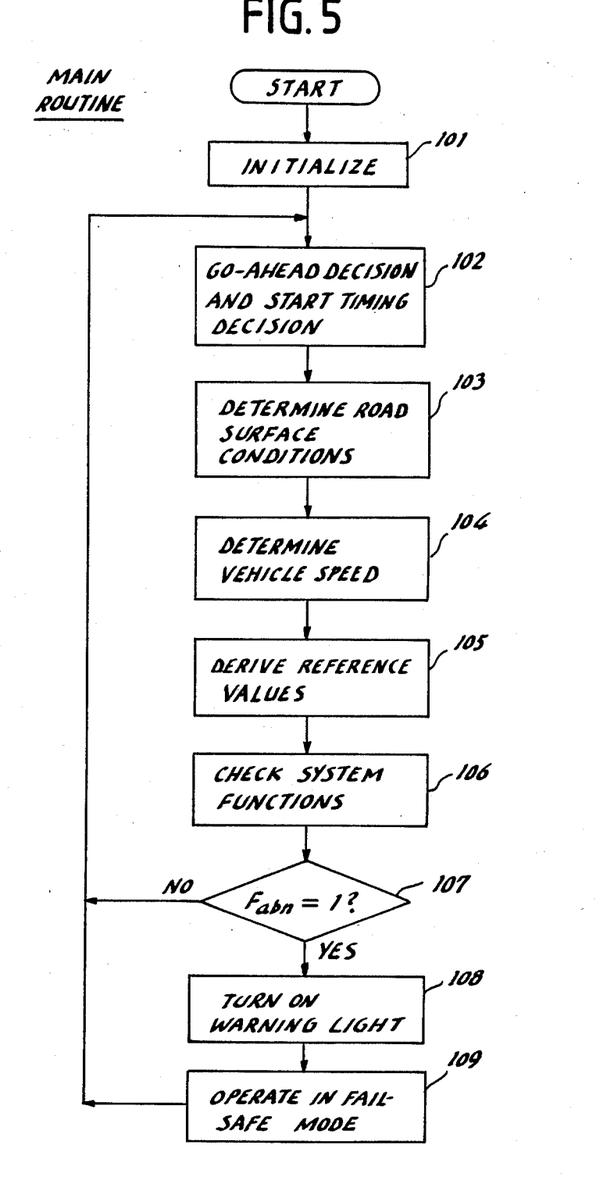
FIG. 5 is an illustration of a flow diagram describing a main routine executed by the microprocessor of FIG. 4.
Figure 6:
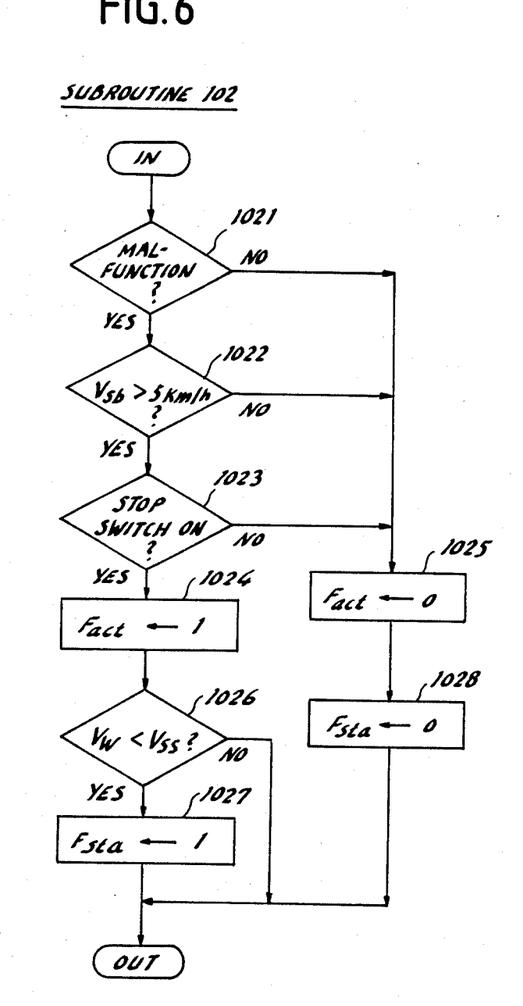
FIG. 6 is a flow diagram of the go-ahead and start timing decision subroutine of FIG. 5.

The microprocessor now proceeds to a subroutine 105, FIG. 5, to derive from vehicle speed Vsb a number of threshold values with which wheel speed and wheel acceleration values are compared to determine down pressure timing.

Figure 9:
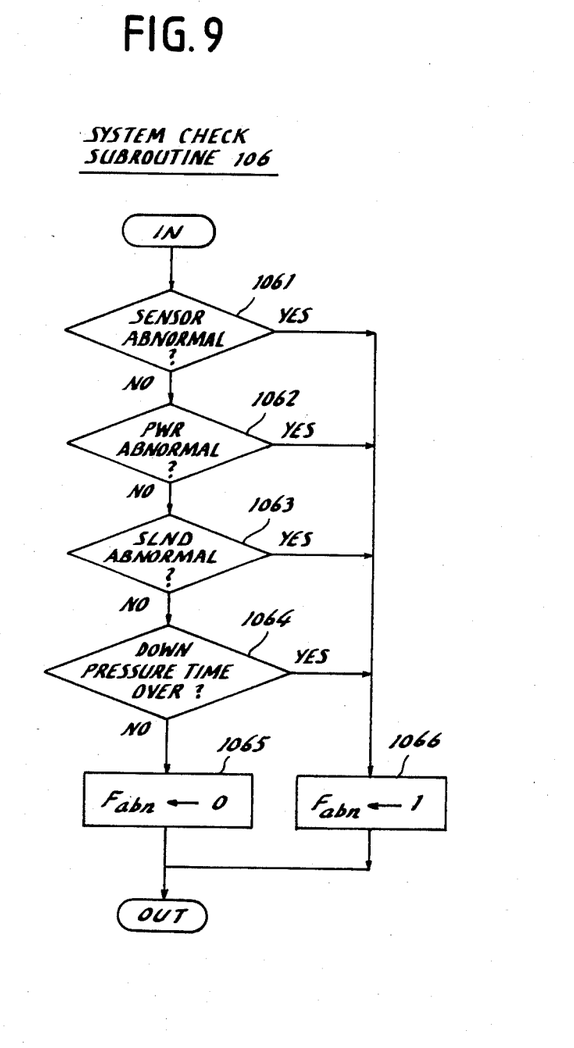
FIG. 9 is a flow diagram describing the system check subroutine of FIG. 5.

Subroutine 105 is followed by a system check subroutine 106 in which the microprocessor checks system functions for abnormal conditions. As shown in FIG. 9, the subroutine 106 comprises blocks 1061 to 1066. In block 1061, wheel speed sensors 5-7 are checked for abnormalities such as disconnection and short-circuit condition. The source voltage of power circuit is checked in block 1062 for under- or over-voltage condition. Actuator solenoids are checked in block 1063 for disconnection and short-circuit and the down pressure operation is checked in block 1064 for abnormal prolongation. If all these functions are normal, control is passed to block 1065 to reset an abnormal flag $F_{abn}$, and if any abnormality is detected, abnormal flag $F_{abn}$ is set up in block 1066.

The microprocessor proceeds to a step 107, FIG. 5, to check the status of abnormal flag $F_{abn}$. If $F_{abn}=0$, indicating that no abnormality is detected, control is jumped to subroutine 102 to repeat the executions described above, and if $F_{abn}=1$, control is passed to a subroutine 108. A control signal is applied to indicator driver 40 which latches it and drives the warning light 25 to alert the vehicle occupant.

A fail-safe subroutine 109 is executed by energizing the cut-off relay 24 to cut off the circuits to the actuators 17–19. Thus, the system is allowed to operate in a manual mode in which the brake pressure is applied in response to the depression of brake pedal in the usual manner. It is preferable that an arrangement be made to cut off the input circuits to actuator drivers 36–38 to ensure against the abnormality of cut-off relay 24.

Figures 10, 11:
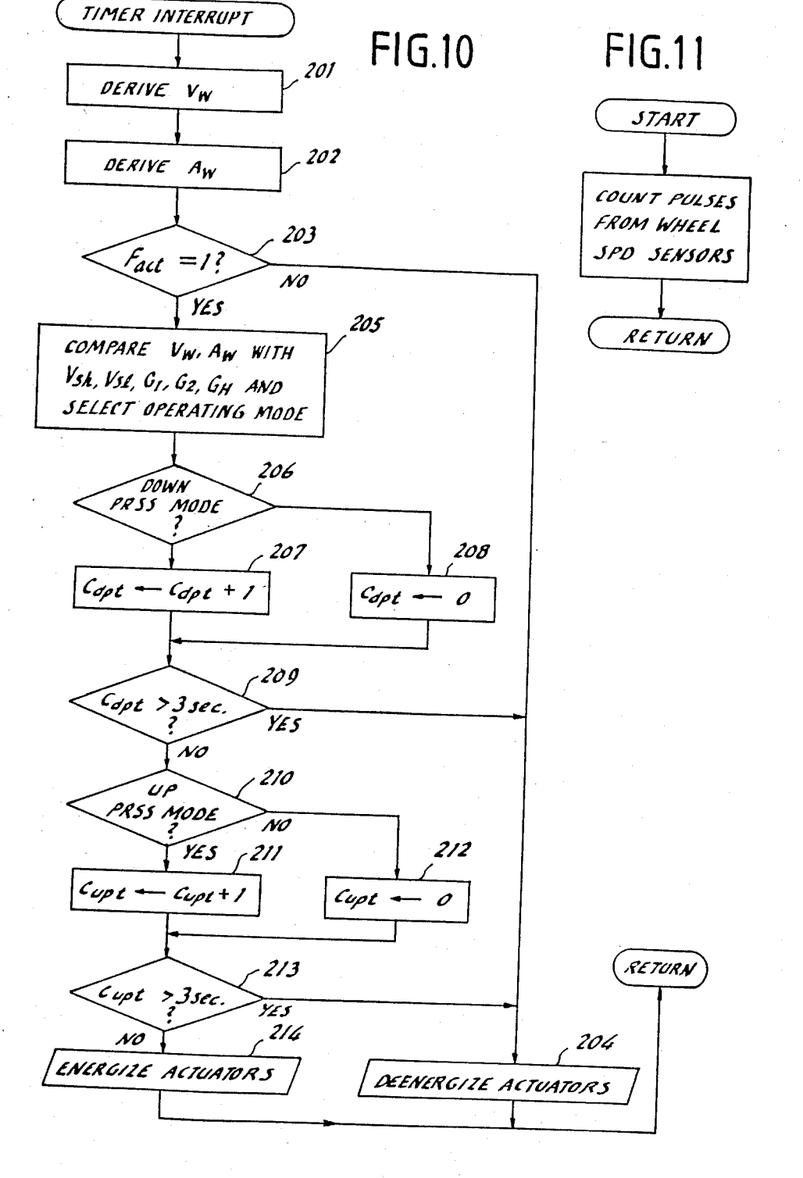
FIGS. 10 and 11 are flow diagrams describing interrupt subroutines.

FIG. 10 is an illustration of a timer interrupt subroutine which is executed at regular intervals during program execution of the main routine. The interrupt routine starts with block 201 in which wheel speed Vw is determined for each of the wheels based on data derived in a wheel speed interrupt routine shown in FIG. 11 by which the main routine is also interrupted in response to the occurrrence of each wheel speed pulse. More specifically, three wheel speed interrupt programs are provided having different priorities to count simultaneously occurring wheel speed pulses at different timing and store the count values in addressible locations of the RAM. In block 201, the counted wheel speed pulses are read from the RAM to detect the difference between the wheel speed count of the previous execution and that derived in the current execution to derive a wheel speed digital value. Wheel acceleration Aw is derived in block 202 by taking a difference between wheel speed values successively derived from each wheel. In blocks 201 and 202 digital filtering techniques may be employed to smooth out insignificant fluctuations.

Control is now passed to block 203. If go-ahead decision is not present, control is jumped to block 204 to deenergize actuators 17–19 so that they return to inoperative state immediately following the go-ahead flag $F_{act}$ being reset. If $F_{act}=1$ in block 203, control is passed to block 205 to compare wheel speed and acceleration values Vw, Aw with reference values Vsh, Vsl, $G_1$, $G_2$ and $G_H$ and select an operating mode. Details of block 205 will be described later.

Control is then advanced to block 206 to check if a down-pressure mode is selected and if so, a down-pressure time counter $C_{dpt}$ is incremented by one in block 207, and if not this counter is reset in block 208.

In block 209, the microprocessor checks if downpressure time counter $C_{dpt}$ exceeds a preset limit, typically 3 seconds, and if so, the actuators 17–19 are deenergized in block 204 and if not, control is passed to block 210 to detect if the selected mode is an up-pressure mode and if so, an up-pressure time counter $C_{upt}$ is incremented by one in block 211, and if not, this counter is reset in block 212. If the counter $C_{upt}$ indicates a 3-second period (block 213), actuators are deenergized, and if not, they remain energized (block 214).

Figure 12:
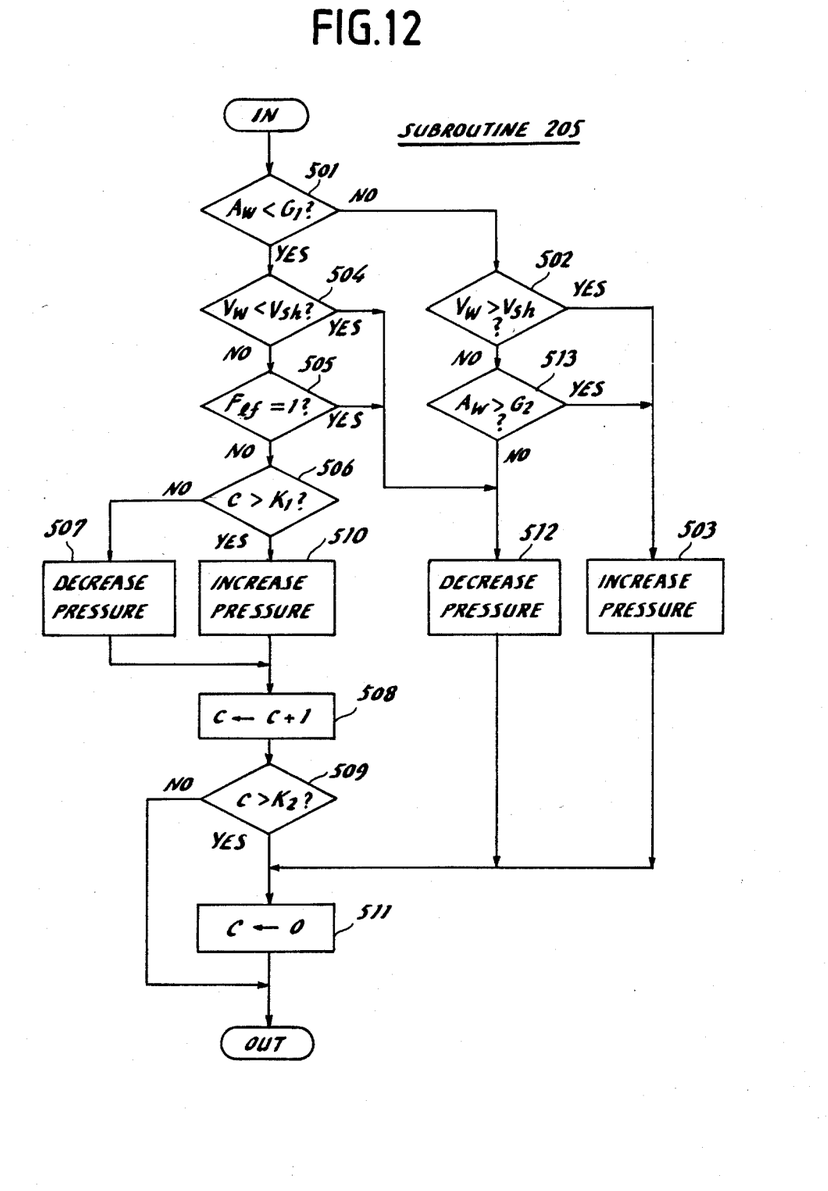
FIG. 12 is a flow diagram of the threshold comparison and mode selection subroutine of FIG. 10.

Referring to FIG. 12, the subroutine 205 of FIG. 10 starts with block 501 in which wheel acceleration Aw is compared with a lower threshold $G_1$.

Figure 14:
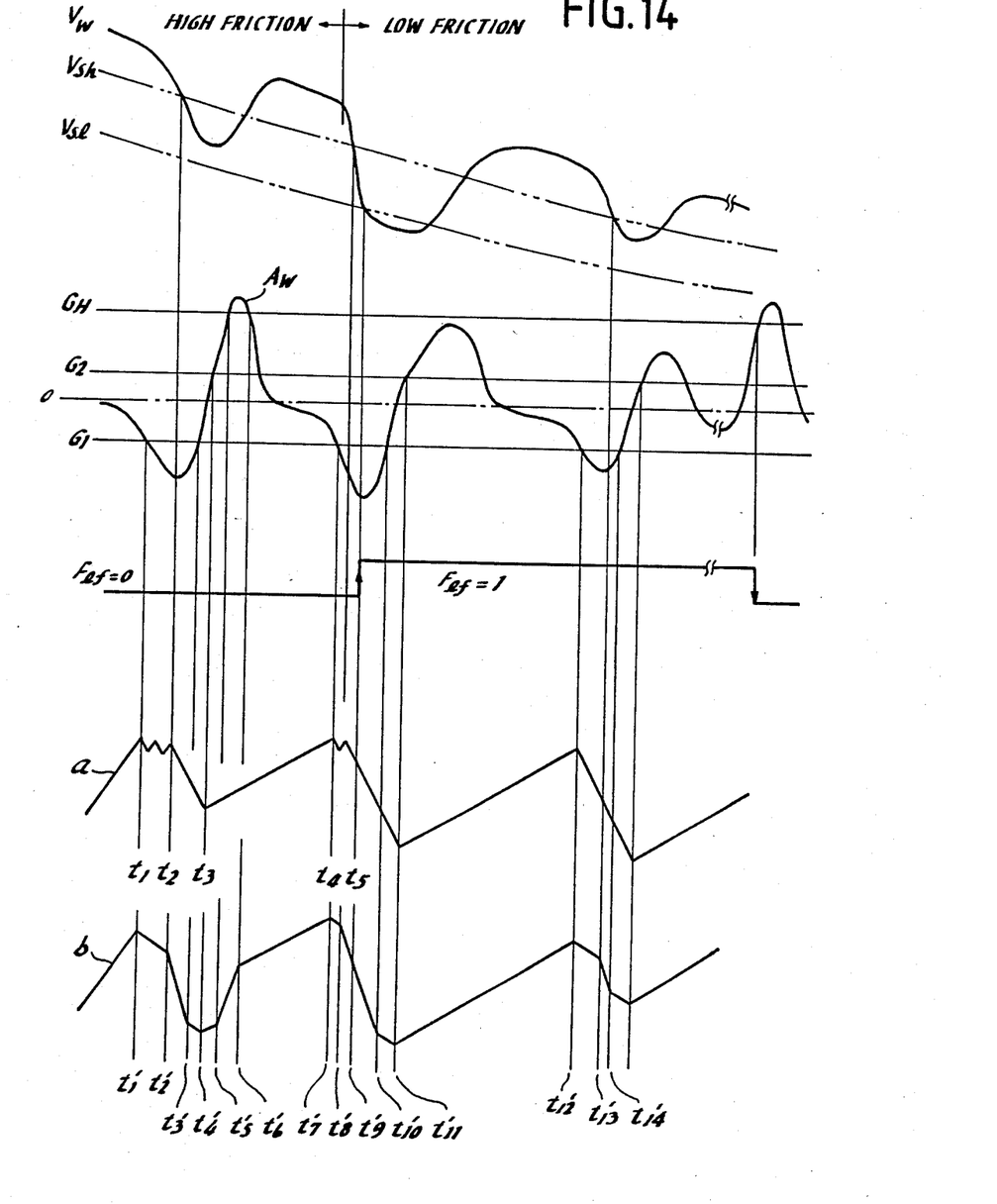
FIG. 14 is a graphic illustration useful for describing the operation of the present invention.

It is known that upon application of brake to a given wheel, it decelerates at a rate higher than its speed decreases and upon release of the brake, as effected in response to a down pressure operation, the wheel begins accelerating at a rate higher than the rate at which wheel speed increases, so that the speed value has peaks and valleys which occur at times delayed with respect to the corresponding peaks and valleys of the wheel acceleration, as illustrated in FIG. 14.

During the period prior to time $t_1$, FIG. 14, both wheel acceleration Aw and wheel speed Vw are higher than thresholds $G_1$ and Vsh respectively. Control is thus passed through blocks 501 and 502 to block 503 to increase brake pressure according to the amount of depression on the brake pedal as shown at a in FIG. 14. A count value C, which determines the length of recyclic periods for down- and up-pressure modes, is reset to zero in block 511.

At time $t_1$, wheel acceleration Aw drops below the lower threshold $G_1$ and the decision in block 501 becomes affirmative and control is passed to block 504. As wheel speed Vw is still higher than Vsh, "no" decision is taken and control reaches block 505 to check the status of the low friction flag $F_{lf}$. If the vehicle is running on a high friction road, a flag status $F_{lf}=1$ is not detected in block 505 and control is passed to block 506 to check if the count value C has exceeded a first threshold $K_1$ representing the termination of a down-pressure mode and at the same time the initiation of a subsequent up-pressure mode. Control advances to block 507, if threshold $K_1$ is not reached, to decrease the brake pressure. Subsequently, count value C is incremented by one in block 508, and checked against a second threshold $K_2$ in block 509 which represents the termination of the subsequent up-pressure mode and at the same time the initiation of the next down-pressure mode, as will be understood as description proceeds. If $C > K_2$, control exits from block 509 to the next subroutine 206 bypassing block 511.

Therefore, with $F_{lf}=0$ the existence of conditions $Aw < G_1$ and $Vw > Vsh$ causes the microprocessor to recyclically perform execution of blocks 501, 504 to 509 to continue the down-pressure mode until count value C reaches the first threshold K1. When threshold $K_1$ is reached during this recycle execution, control is passed to block 510 to increase the brake pressure and further increment the count value by one in block 508. It is seen that the up-pressure mode prevails during the period equal to $K_2 - K_1$. The count value C is reset to zero when the $K_2$ threshold is exceeded. The fact that the count value is cleared causes control to proceed to block 507 to reinitiate the down-pressure mode. Thus, down-pressure and up-pressure modes are alternately performed until wheel speed Vw reduces below threshold Vsh at time $t_2$, as shown at a in FIG. 14. This alternate operation results in a gradual decrease in brake pressure as seen in FIG. 14.

Next, conditions $Aw < G_1$ and $Vw < Vsh$ prevail and control is passed through blocks 501 and 504 to block 512 and the brake pressure is decreased. Execution of blocks 501, 504, 512 and 511 is continued to effect the down pressure mode. With the down pressure mode being in progress, wheel acceleration rises above the $G_1$ threshold and control is passed through blocks 501 and 502 to block 513 to check if acceleration has reached a higher threshold $G_2$. Execution of block 512 is continued to decrease the pressure until Aw rises above $G_2$ at time $t_3$. During the period from $t_3$ to $t_4$ conditions $Aw<G_1$ and $Vw>Vsh$, or conditions $Aw<G_1$, $Vw<Vsh$ and $Aw>G_2$ occur and block 503 is repeatedly executed to increase the brake pressure.

Reduction of wheel speed below the lower threshold Vsl at time $t_5$ causes the low friction flag $F_{lf}$ to be established. With $F_{lf}=1$, recycle execution of subroutine 205 causes control to pass through block 505 to block 512 to decrease the pressure continually, rather than alternating between down- and up-pressure modes. Therefore, under low friction conditions down pressure operation is rapidly provided to release the brake appropriately. The subroutine of FIG. 12 makes use of up-/down pressure switching solenoids without rapid-/gradual switching solenoids.

Figure 13:
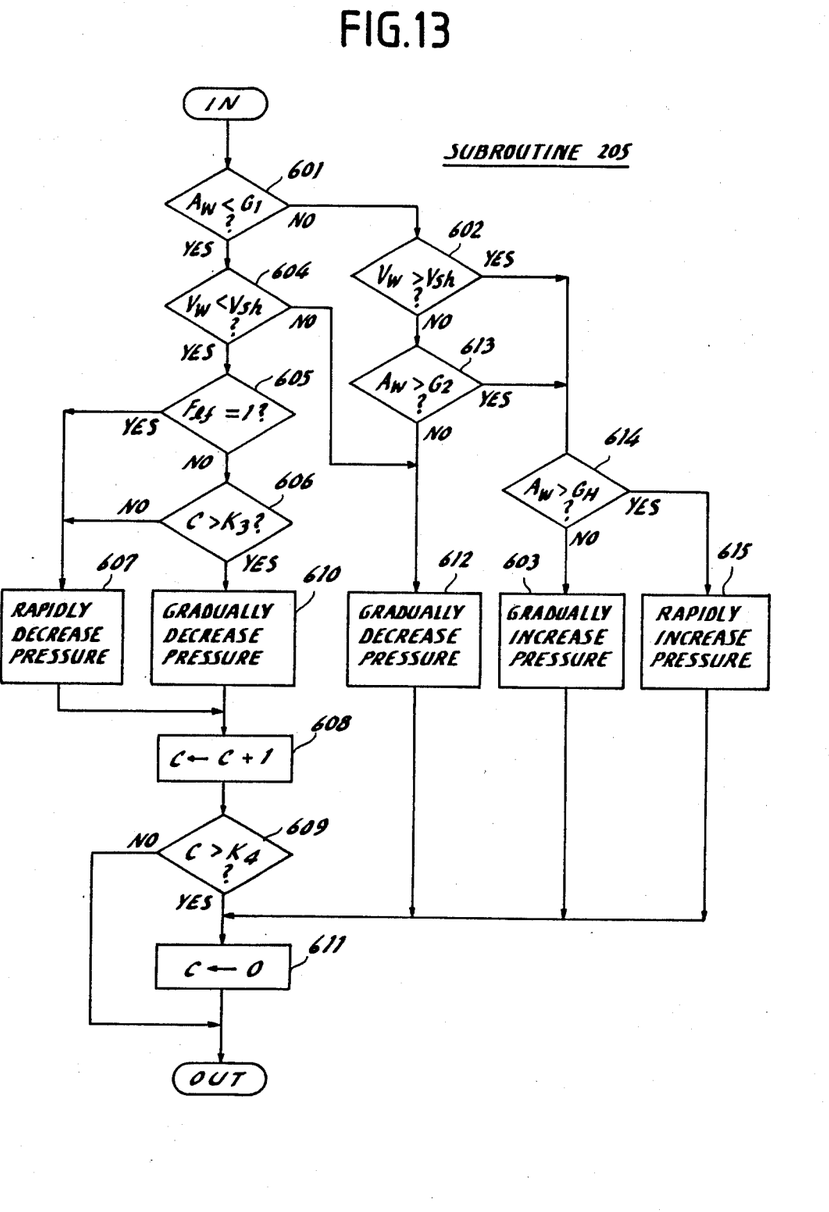
FIG. 13 is a flow diagram of a modified form of the threshold comparison and mode selection subroutine.

FIG. 13 is a modification of the FIG. 12 subroutine in which gradual/rapid switching solenoids are employed in addition to up/down switching solenoids. This subroutine differs from FIG. 12 in that down-pressure modes of blocks 507 and 512 of FIG. 12 are replaced with rapid down-pressure mode of block 607 and gradual down-pressure of block 612, respectively and up-pressure mode of block 510 is replaced with gradual down-pressure mode of block 610, and that control exits from block 604 to block 612 if $Vw>Vsh$ or block 605 if $Vw<Vsh$ and thence to block 607 to effect rapid down pressure mode if $F_{lf}=1$. Blocks 614 and 615 are added to cause control to pass to block 614 if $Aw>G_1$ and $Vw>Vsh$ or $Aw>G_2$ and $Vw<Vsh$ to check if $Aw>G_H$ and if so, block 615 is executed to rapidly increase the pressure and if $Aw<G_H$ block 603 is executed to gradually increase the pressure. Other differences reside in blocks 606 and 609 where the count value C is compared with thresholds $K_3$ and $K_4$ (where $K_4>K_3$).

During the period from time $t_1'$ to time $t_2'$ in which conditions $Vw>Vsh$ and $Aw<G_1$ prevail, control is initially passed through blocks 601 and 604 to block 612 to effect gradual down-pressure operation and goes to block 611 to reset counter C.

Between times $t_2'$ and $t_3'$ in which $Aw<G_1$ and $Vw<Vsh$, control passes through block 601, 604, 605 and 606 to block 607 to rapidly decrease the brake pressure and goes through blocks 608 and 609 to increment counter C. Thus, rapid down-pressure mode is continued until count value C reaches threshold $K_3$ at time $t_3'$ (block 606), whereupon control is switched to block 610 to effect gradual down-pressure mode until count value C becomes equal to threshold $K_4$, resetting the counter C in block 611. The resetting of count value c causes control to pass through blocks 601, 604, 605, 606 and 607 to effect the rapid down-pressure mode again until time $t_3'$. It is seen that as long as conditions $Vw<Vsh$ and $Aw<G_1$ exist, rapid and gradual down-pressure modes are alternately executed.

If conditions $Aw>G_1$ and $Vw<Vsh$ occur at time $t_3'$, control is passed through blocks 601, 602 and 613 to block 612 to switch the down-pressure operation to a gradual mode, terminating the alternating rapid and gradual down-pressure operations. This gradual down-pressure mode is continued until conditions $Aw>G_2$ and $Vw<Vsh$ occur at time $t_4'$ whereupon control is passed to block 614. During the period between $t_4'$ and $t_5'$, conditions $Aw<G_H$ and $Vw<Vsh$ prevail and the microprocessor proceeds to block 603 to increase the brake pressure gradually. When acceleration is higher than $G_H$ during the period $t_5'$ and $t_6'$, control is switched to block 615 to switch the up-pressure operation to rapid mode.

During the period between $t_6'$ and $t_7'$, conditions $G_1<Aw<G_H$ and $Vw>Vsh$ prevail and block 603 is executed to effect gradual up-pressure mode. With $Aw<G_1$ at time $t_7'$, control is passed through blocks 601 and 604 to block 612 to gradually decrease the pressure. With $Vw<Vsh$ at time $t_8'$, control is passed through blocks 605, 606 and 607 to effect rapid down-pressure mode.

At time $t_9'$ wheel speed Vw becomes lower than Vsl and slip-friction flag $F_1$ is set up and control is passed from block 605 to block 607 to continue the rapid down-pressure mode until time $t_{10}'$. Between times $t_{10}'$ and $t_{11}'$ ($G_1<Aw<G_2$, $Vw<Vsh$), block 612 is executed to provide gradual down-pressure mode. During the period between times $t_{11}'$ and $t_{12}'$, control is passed through blocks 601, 602, 613 and 614 to block 603 to switch the brake pressure gradient to a gradually increasing mode.

Between times $t_{12}'$ and $t_{13}'$, control is passed through blocks 601, 604 to 612 to effect gradual down-pressure mode. At time $t_{13}'$, control is switched from block 604 to block 605 and thence to block 607 to change the down-pressure operation to rapid mode until time $t_{14}'$. Between times $t_{14}'$ and $t_{15}'$, control passes through blocks 601, 602, 613 and 612 to gradually decrease the brake pressure.

What is claimed is:

1. An antiskid control system for a hydraulic braking system of a wheeled vehicle having means for lowering the fluid pressure of the braking system at a variable rate comprising:

means for detecting a speed of a vehicle wheel; and data processing means for:
 (a) detecting a rate of variation of said detected wheel speed;
 (b) detecting when said wheel speed variation rate becomes higher than high acceleration threshold to produce a first indication that the surface friction of the road is high, and for detecting when said wheel speed becomes lower than a low speed threshold to produce a second indication that said surface friction is low;
 (c) if said first indication is given, detecting a gradual down-pressure mode when said wheel speed is higher than a high speed threshold and said wheel speed variation rate is simultaneously lower than a low acceleration threshold and operating said pressure lowering means at a lower rate during said detected gradual down-pressure mode;
 (d) if said first indication is given, detecting a rapid down-pressure mode when said wheel speed is lower that said high speed threshold and said wheel speed variation rate is simultaneously lower than a medium acceleration threshold and operating said pressure lowering means at a higher rate which is higher than said lower rate in response to said detected rapid down pressure mode;
 (e) if said second indication is given, detecting said rapid down-pressure mode when one of: (a) said wheel speed is higher than said high speed threshold and said wheel speed variation rate is simultaneously lower than said low acceleration threshold and (b) when said wheel speed is lower than said high speed threshold and said wheel speed variation rate is simultaneously lower than said medium acceleration threshold, and operating said pressure lowering means at said higher rate in response to the last-mentioned rapid down-pressure mode; and (f) detecting an up-pressure mode when one of (a) said wheel speed is higher than said high speed threshold and said wheel speed variation rate is simultaneously higher than said low acceleration threshold and (b) when the wheel speed variation rate is higher than said medium acceleration threshold, and disabling said pressure lowering means in response to said detected up-pressure mode.

2. A method for controlling the fluid pressure of a hydraulic braking system of a wheeled vehicle, the steps of:

(a) detecting the speed of a vehicle wheel;

(b) detecting the acceleration of the wheel;

(c) detecting when said wheel acceleration becomes higher than a higher acceleration threshold for giving a first indication that the surface friction of the road is high and detecting when said wheel speed becomes lower than a lower speed threshold for giving a second indication that said surface friction is low;

(d) if said first indication is given, detecting a gradual down-pressure mode when the wheel speed is higher than a higher speed threshold and the wheel acceleration is simultaneously lower than a lower acceleration threshold;

(e) operating said pressure decreasing means at a lower rate during the detected gradual down-pressure mode;

(f) if said first indication is given, detecting a rapid down-pressure mode when the wheel speed is lower than said higher speed threshold and the wheel acceleration is simultaneously lower than a medium acceleration threshold;

(g) if said second indication is given, detecting said rapid down-pressure mode when the wheel speed is higher than said higher speed threshold and the wheel acceleration is simultaneously lower than said lower acceleration threshold or when the wheel speed is lower than said higher speed threshold and the wheel acceleration is simultaneously lower than said medium acceleration threshold;

(h) operating said pressure decreasing means at a higher rate which is higher than said lower rate during the rapid down-pressure mode detected by either the step (f) or step (g);

(i) detecting an up-pressure mode when the wheel speed is higher than said higher speed threshold and the wheel acceleration is simultaneously higher than a lower acceleration threshold or when the wheel acceleration is higher than said medium acceleration threshold; and (j) disabling said pressure decreasing means during the detected up-pressure mode.

3. An antiskid control system for a hydraulic braking system of a wheeled vehicle having means for lowering the fluid pressure of the braking system at a variable rate, said variable rate operable at a higher rate and a lower rate, comprising:

(a) speed detector means for detecting a speed of a vehicle wheel;

(b) rate variation detector means responsive to a rate of variation of the detected wheel speed for detecting when said wheel is under one of positive and negative acceleration;

(c) vehicle speed detector means for detecting the speed of said vehicle;

(d) friction detector means responsive to said detected vehicle speed for deriving a reference wheel speed and generating a high friction signal in response to said detecting of said negative acceleration until said wheel speed reaches said reference wheel speed and generating a low friction signal when said wheel speed becomes lower than said reference wheel speed;

(e) control means responsive to the detection of said negative acceleration for controlling said pressure lowering means for a period of time to decrease said braking pressure at said higher and lower rates and responsive to said detection of the positive acceleration for controlling said pressure lowering means to increase said braking pressure and terminate said period;

(f) correcting means responsive to said high friction signal for controlling said pressure lowering means during a portion of said period during which the pressure of said braking system is decreased by said control means at said lower rate which is lower than said higher rate during said portion; and (f) disabling means responsive to the low friction signal for disabling said correcting means.

4. An antiskid control system as claimed in claim 3, wherein said correcting means includes means for alternately operating and releasing said pressure lowering means at time intervals that correspond to said portion of said period to reduce said rate in response to said high friction signal and said detection of said negative acceleration.

5. An antiskid control system as claimed in claim 3, wherein said correcting means includes means for gradually operating said pressure lowering means for said portion of said period in response to said high friction signal and said detection of the negative acceleration.

6. An antiskid control system for a hydraulic braking system of a wheeled vehicle having means for lowering the fluid pressure of the braking system at a variable rate, said variable rate operable at a higher rate and a lower rate, comprising:

speed detector means for detecting a speed of a vehicle wheel;

rate variation detector means responsive to a rate of variation of the detected wheel speed for detecting when said wheel is under positive or negative acceleration;

vehicle speed detector means for detecting the speed of said vehicle;

friction detector means responsive to said detected vehicle speed for deriving a reference wheel speed and generating a high friction signal in response to said detecting of said negative acceleration until said wheel speed reaches said reference wheel speed and generating a low friction signal when said wheel speed becomes lower than said reference wheel speed; and control means responsive to the detection of the negative acceleration for controlling said pressure lowering means for a period of time to decrease the braking pressure at said higher and lower rates and responsive to said detecting of said positive acceleration for controlling said pressure lowering means to increase said braking pressure and terminate said period and further responsive to said high friction signal for controlling said pressure lowering means at said lower rate which is lower than said higher rate for a portion of said period during which said pressure is decreased.

7. An antiskid control system as claimed in claim 6, wherein said control means includes means for alternately operating and releasing said pressure lowering means at intervals that correspond to said portion of said period to reduce said rate exclusively in response to said high friction signal and the detection of said negative acceleration.

8. An antiskid control system as claimed in claim 6, wherein said control means includes means for gradually operating said pressure lowering means for said portion of said period exclusively in response to said friction signal and the detection of the negative acceleration.

9. An antiskid control system for a hydraulic braking system of a wheeled vehicle having means for lowering the fluid pressure of the braking system at a variable rate comprising:
   means for detecting a speed of a vehicle wheel; and data processing means for:
   (a) detecting a rate of variation of said detected wheel speed;
   (b) detecting when said wheel speed variation rate becomes higher than a high acceleration threshold for giving a first indication that the surface friction of the road is high and detecting when said wheel speed becomes lower than a low speed threshold for giving a second indication that said surface friction is low;
   (c) if said first indication is given, detecting a gradual down-pressure mode when said wheel speed is higher than a high speed threshold and the wheel speed variation rate is simultaneously lower than a low acceleration threshold;
   (d) operating said pressure lowering means at a lower rate in response to the detection of said gradual down-pressure mode;
   (e) measuring an elapse of time from the initiation of the operation of said pressure lowering means at said higher rate;
   (f) disabling said pressure lowring means when said measured time reaches a preset value;
   (g) if said first indication is given, detecting a rapid down-pressure mode when the wheel speed is lower than said high speed threshold and the wheel speed variation rate is simultaneously lower than a medium acceleration threshold and operating said pressure lowring means at a higher rate which is higher than said lower rate in response to said detected rapid down-pressure mode;
   (h) if said second indication is given, detecting one of (a) said rapid down-pressure mode when the wheel speed is higher than said high speed threshold and said wheel speed variation rate is simultaneously lower than said low acceleration threshold, and (b) when the wheel speed is lower than said high speed threshold and the wheel speed variation rate is simultaneously lower than said low acceleration threshold and operating said pressure lowering means at said higher rate in response to the last mentioned rapid down-pressure mode and
   (i) detecting an up-pressure mode when one of (a) said wheel speed is higher than said high speed threshold and the wheel speed variation rate is simultaneously higher than said low acceleration threshold and (b) when the wheel speed variation rate is higher than said medium acceleration threshold and disabling said pressure lowering means in response to such detection.

* * * * *